July 29, 1958

C. F. VAN HOOK 2,844,876

MEASURING MACHINE

Filed March 10, 1954

4 Sheets-Sheet 1

INVENTOR.
CHARLES F. VAN HOOK
BY George F. Gill
Attorney

July 29, 1958 C. F. VAN HOOK 2,844,876
MEASURING MACHINE
Filed March 10, 1954 4 Sheets-Sheet 2
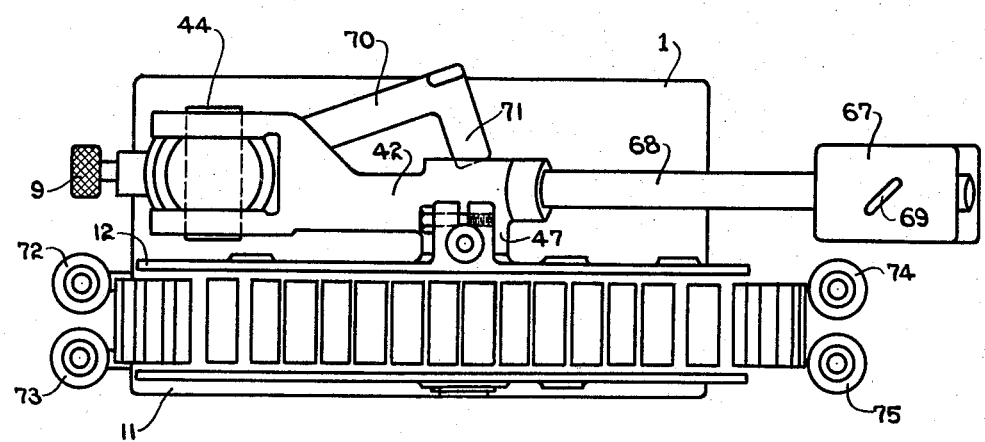
FIG. 2
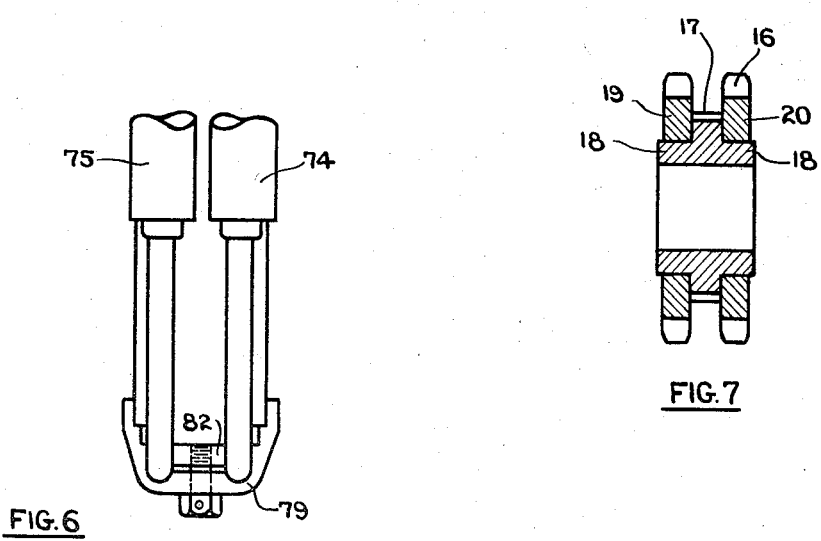
FIG. 6
FIG. 7
INVENTOR.
CHARLES F. VAN HOOK
BY George T. Gill
Attorney July 29, 1958 C. F. VAN HOOK 2,844,876
MEASURING MACHINE Filed March 10, 1954 4 Sheets-Sheet 3

INVENTOR.
CHARLES F. VAN HOOK
BY
George T. Gell
Attorney.

July 29, 1958 C. F. VAN HOOK 2,844,876
MEASURING MACHINE
Filed March 10, 1954 4 Sheets-Sheet 4

INVENTOR.
CHARLES F. VAN HOOK
BY
George F. Gill
Attorney

United States Patent Office 2,844,876
Patented July 29, 1958

2,844,876
MEASURING MACHINE
Charles F. Van Hook, Fair Lawn, N. J.
Application March 10, 1954, Serial No. 415,355
1 Claim. (Cl. 33—134)

The invention herein disclosed relates to a measuring machine for obtaining lineal measurements. More particularly, the invention relates to a linear measuring machine that is adaptable to measuring products having various cross sections.

Heretofore, and prior to the invention herein disclosed, linear measuring machines of the kind to which this invention relates commonly included a wheel geared to a counter. The product to be measured engages the wheel in pressure contact during relative movement of the product and measuring machine. Such machines have certain disadvantages which affect the accuracy thereof. Among these are the facts that the product may be stretched in passing through the machine; the fact that the wheel diameter may vary through wear or by the accumulation of matter on its surface; the fact that on starting and stopping there may be slippage of the wheel on the product; and the fact that the measured product must pass through the machine at exact right angle to the axis of the wheel.

The primary object of this invention is to provide a linear measuring machine that eliminates the abovementioned disadvantages of existing machines. Another object of the invention is to provide a machine of the kind mentioned that is highly accurate. A further object of the invention is to provide such a machine that is readily adjustable to products of different cross sections.

The foregoing objects and certain advantages that will hereinafter appear are realized in the particular embodiment of the invention illustrated in the accompanying drawing and described in detail below, from which description a clear understanding of the invention may be had.

Figure 1:
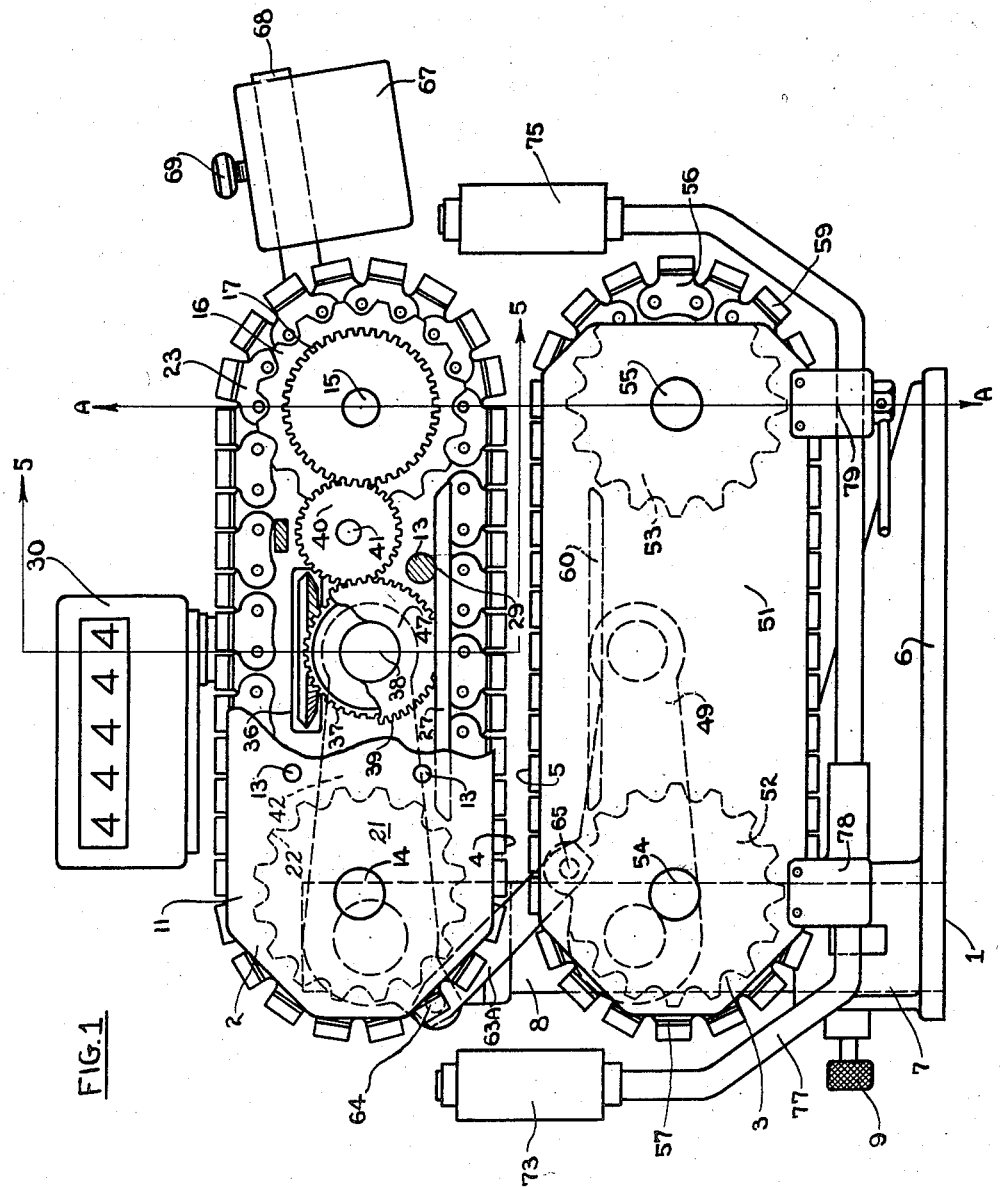
Figure 3:
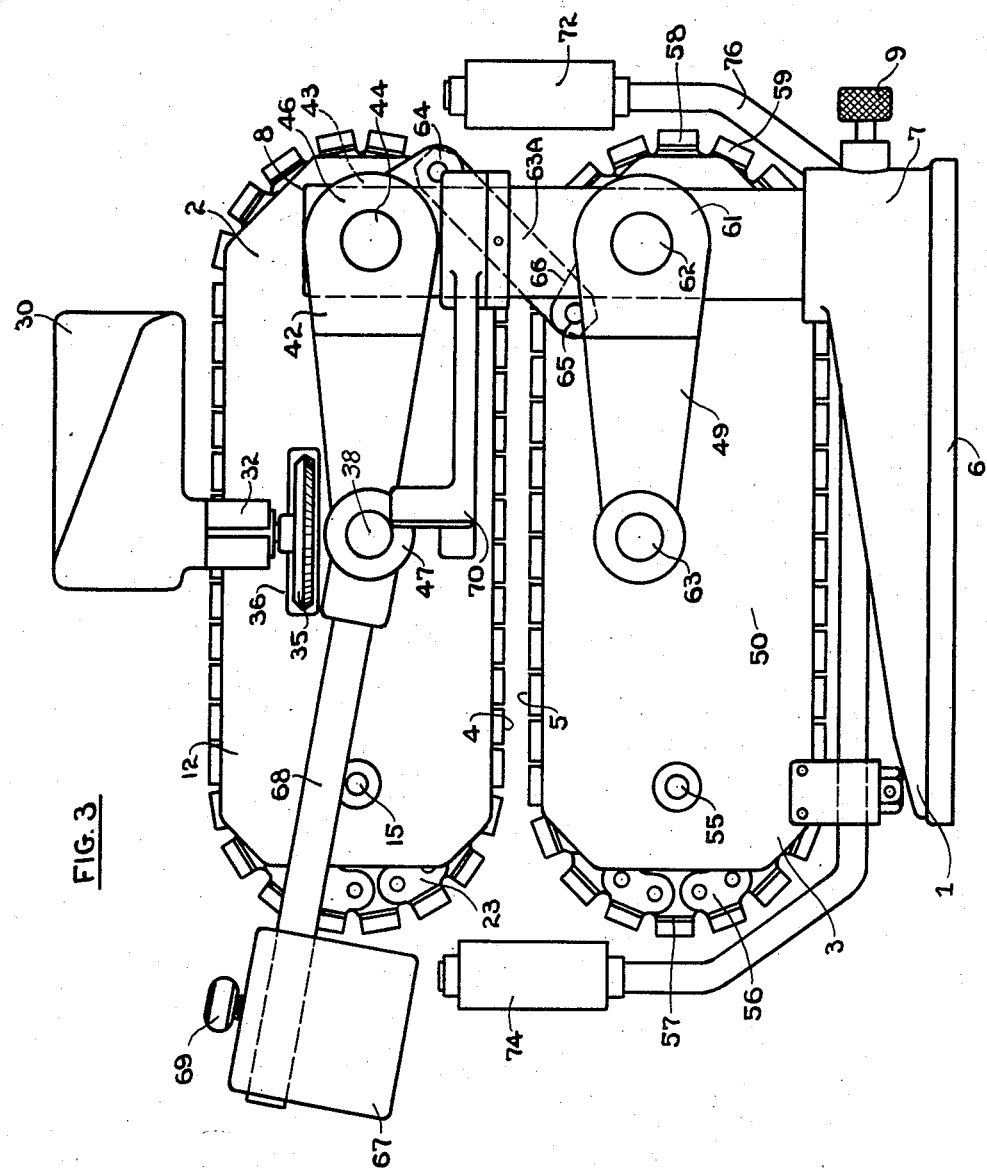
Figure 4:
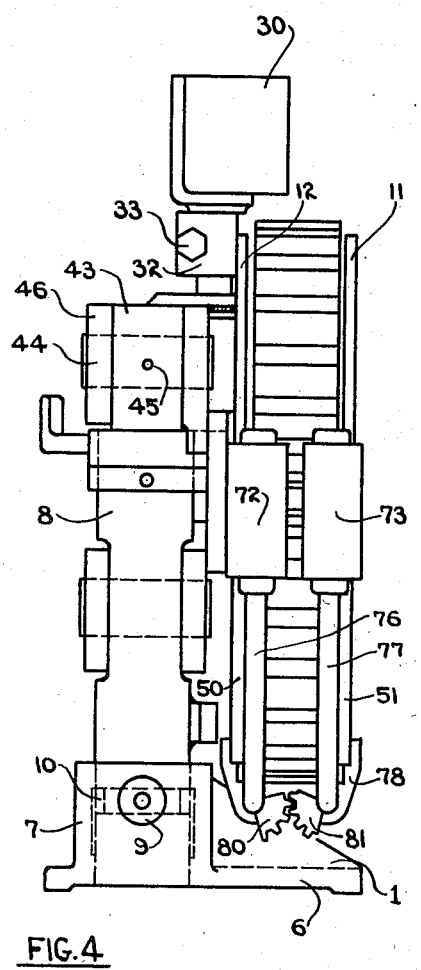
Figure 5:
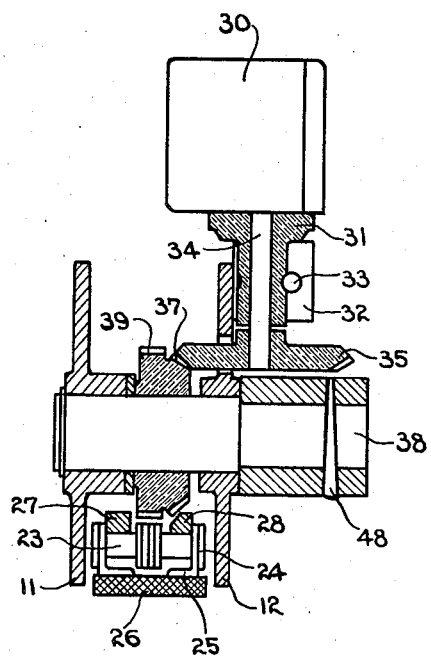

The drawings include:

Fig. 1 which is a side elevation of a linear measuring machine embodying the invention, a side wall of a part thereof being broken away;

Fig. 2 which is a plan of the same with the counter removed;

Fig. 3 which is a side elevation of the same on the side opposite to that of Fig. 1;

Fig. 4 which is an end elevation of the same;

Fig. 5 which is a fragmentary section taken on the line 5—5 of Fig. 1;

Fig. 6 which is a fragmentary end elevation; and

Fig. 7 which is a fragmentary sectional elevation taken on the line A—A of Fig. 1.

In general, the measuring machine illustrated in the drawing includes a support 1 and two tractive units 2 and 3 mounted on the support. The tractive units are arranged to provide opposed, parallel, movably mounted, tractive surfaces, designated generally by the numerals 4 and 5, that engage a product placed therebetween. Relative movement of the product and tractive units effects movement of the tractive surfaces. Such movement, of at least one of the tractive surfaces, is recorded through a positive connection with a counter to provide the linear measurement of the product engaged.

The support 1 includes a base 6 having at one end thereof a laterally extending, hollow boss 7. Rotatably mounted in and extending from the boss 7, there is a post 8 which supports the tractive units 2 and 3. A spring-pressed, pull-pin latch 9 extends through the wall of the boss 7 and into a circumferential groove 10 formed in the post. Depressions are provided in the wall of the groove 10 into which the pin extends to fix the post in one or more predetermined positions. Such a pull-pin latch arrangement is old and well known, and it is not, therefore, disclosed in detail.

The tractive unit 2 includes a frame that consists of spaced plates 11 and 12 secured together by shouldered cross pins 13, the ends of which extend through the plates and are welded thereto. Adjacent each end of the frame there is a shaft, shafts 14 and 15, extending through the frame and fixed therein. Rotatably mounted on the shaft 15 there is a sprocket 16 and gear 17 combination that consists of the gear 17 having oppositely extending hubs 18 on which sprocket plates 19 and 20 are mounted, the gear 17 being between the plates 19 and 20. A sprocket 21 having axially spaced, chain-engaging teeth 22 about the circumference thereof is rotatably mounted on the shaft 14.

An endless, articulated roller chain 23 extends about and engages the sprockets. As part of the roller chain links there are right angle wings 24 having transverse surfaces 25 extending across the rollers, outwardly of the link center line. To the surfaces 25 of the wings 24, there are secured pads 26 of material suitable for traction. Desirably, for many products, the pads 26 may be of tread composition for traction and wear. Between the sprockets, the pads 26 form a substantially continuous surface, the surface 4, as successive pads engage at the surfaces thereof.

In order to provide a substantially rigid surface 4, between the sprockets, and for effecting a uniform pressure on the product, there is provided a pair of fixed tracks or rails 27 and 28 which engage the roller chain intermediate the sprockets 16 and 21. These tracks are mounted within the frame, extend longitudinally of the frame, and are welded in position to the adjacent, shouldered pins 13. Each pin 13 has, at the location of the adjacent rail, a groove, such as the groove 29 that is complementary, to the contour of the rail, and the rail is fixed in the groove and restrains the rail against movement. The pins also position the rails to maintain the chain, and in consequence the surface 4, in a fixed path, i. e., they prevent flexing of the chain.

Through the gear 17 and the train of mechanism described below, movement of the chain 23 is recorded on a counter 30 fixed to the plate 12 of the frame. The case of the counter 30 has a bushing 31 extending therefrom that is received in a split boss 32 formed integral with the plate 12. A bolt 33 is provided for tightening or loosening the engagement of the boss 32 with the bushing 31. With this arrangement, the face of the counter is readily positioned for the greatest facility in reading, as related to the position of the measuring machine.

The counter has a drive shaft 34 extending and rotatably mounted in the bushing 31. On the end of this shaft there is mounted a bevel gear 35 that extends through a slot 36 in the wall 12 of the frame. Within the frame, the gear 35 meshes with a bevel gear 37 rotatably mounted on a shaft or pivot pin 38 rotatably mounted in, and extending through the frame and beyond the plate 12. The bevel gear 37 is formed integral with or secured to a spur gear 39. This latter gear 39 meshes with an idler gear 40 rotatably mounted on a shaft 41, which gear 40 also meshes with the gear 17. In this manner, the counter 30 records the movement of the surface 4. It is to be noted that the connection between the surface 4 and the counter is positive, a chain and gear train. Hence, any movement of the surface 4, which surface engages the product, must be reflected in the counter, Obviously, the counter may be geared, in relation to the surface 4, to indicate any desired relation, as for example, feet and inches, meters and centimeters, etc.

The tractive unit described above is mounted on the post 8 through a lever 42. At its outer end, the end away from the boss 7, the post 8 is machined to provide a section 43 having parallel side faces which section is drilled to receive a pivot pin 44 that extends through the post and is fixed therein by a set screw 45. The lever 42 has a bifurcated end section 46 that embraces the section 43 of the post and is pivoted on the pin 44. Spaced from the section 46, the lever 42 has a lateral hollow boss 47 which receives the extended end of the shaft 38. A pin 48 secures the shaft 38 in the boss. So mounted, the tractive unit 2 has limited movement toward and away from the unit 3.

The tractive unit 3 is also mounted on a lever, the lever 49, that is pivotally secured to the post 8. In the particular machine disclosed, the unit 3 includes a frame that consists of spaced plates 50 and 51 between which there are rotatably mounted two sprockets 52 and 53, one at each end of the frame. The sprocket 52 is mounted on a shaft 54, and the sprocket 53 is mounted on a shaft 55, the shafts extending between and through the plates 50 and 51. An endless, articulated roller chain 56 extends about and engages the sprockets, of which chain links there are also right angle wings 57 having transverse surfaces 58 extending across the rollers outwardly of the link center line. Pads 59, similar to the pads 26 of the unit 2, are secured to the wings 57. Within the frame, there are mounted a pair of rails, such as the rail 60, which engage the chain to maintain the chain, and in consequence, the tractive surface 5, against sagging between the sprockets.

The lever 49 has a bifurcated end section 61 that embraces the post 8 and that is pivotally secured to the post by a pivot pin 62. A shaft 63 extending from the frame, and on which the frame is pivoted, extends into a transverse boss at the other end of the lever 49. The levers 42 and 49 are connected together by a link 63A. One end of the link 63A is pivotally connected by a pivot pin 64 fixed to the lever 42. The pivot pin 64 is fixed to the lever 42 at a point, as shown, between the pivot 44 and the boss 47. The other end of the link 63A is pivotally secured by a pivot 65 to a lug 66 extending from the bifurcated end 61 of the lever 49. As the link 63A engages the levers on the opposite sides of the pivotal axis of the levers, the levers move together toward and away from each other. Such movement is equal as the crank arms represented by the distances of the pivot pins 64 and 65 from the pivotal axis of the levers are equal.

With the arrangement described above, together with the fact that the tractive units are pivotally connected to the levers, no special adjustments are necessary when it is desired to use the machine for products of different widths or diameters, either in regard to the relation of the tractive units to each other or in the height thereof with respect to the product producing machine with which the measuring machine may be used.

The tractive units are, in the machine illustrated, urged toward each other by a weight 67. This weight 67 is movable along a rod 68 that extends from the end of the lever 42. It may be fixed in any position on the rod, to provide a constant force of the desired amount, by a thumb screw 69. Obviously, if the machine is used in other than a vertical position, other means, such as a spring or a piston, might be used instead of the weight. When it is desired to inspect the tractive units or adjust a product therebetween, the units may be held in a separated position by a pivoted rest 70. The rest 70 consists of a lever pivoted on the post 8 about the axis thereof. A lateral end portion 71 is positioned so that upon movement of the lever toward the units, it may be positioned to engage the surface 4 of the tractive unit 2 and hold the units in the separated position.

At each end of the machine there is a pair of guide rolls for positioning the product measured centrally of the tractive surfaces. Guide rolls 72 and 73 are at one end of the machine, and guide rolls 74 and 75 are at the other end of the machine. The guide rolls 72 and 74 are rotatably mounted on the ends of a substantially U-shaped rod 76, and the guide rolls 73 and 75 are mounted on a like U-shaped rod 77. These rods 76 and 77 are rotatably mounted in brackets 78 and 79 secured to the tractive unit 3. Sector gears 80 and 81 are fixed respectively to the rods 76 and 77 and mesh with each other. Thus, the guide rolls move equally away from and toward the center line of the tractive units when adjusted for a product. When adjusted, the rods are clamped in the adjusted position by a clamping plate 82 which is engaged by a screw extending through the bracket 79.

As relative movement between a product extending through the machine is effected with respect to the machine, the tractive surfaces engage the product and are actuated thereby. Thus, the length of the product is recorded on the counter 30. All moving parts are mounted on anti-friction bearings and pivots so as to require minimum effort to actuate, and accordingly the least tension possible is effected on the product.

From the foregoing description of the machine illustrated in the drawing, it will be apparent that by this invention there is provided a lineal measuring machine in which there is no elongation of the product being measured; in which wear or uniform accumulations on the tractive surfaces does not affect the count of the counter; in which there is uniform pressure throughout the length of the tractive surfaces, between the tractive surfaces and the product; and in which the guide roller supports move uniformly on change in the diameter of the product so that the product is centered with respect to the tractive surfaces.

It will be obvious that various changes may be made by those skilled in the art in the details of the machine disclosed in the drawings and described above within the principle and scope of the invention as expressed in the appended claim.

I claim:

A linear measuring machine of the kind described comprising in combination a support, a pair of opposed tractive units movably mounted on the support for movement toward and away from each other, each tractive unit including spaced rotatably mounted sprockets, an endless articulated roller chain engaging the sprockets, the chain having a material-engaging surface spaced outwardly of the link center line, and means engaging the roller chain for maintaining the material-engaging surface in a straight line between the sprockets, one of said units including means for recording the lineal movement of the chain, means connecting the units for effecting equal movement of the tractive units toward and away from each other, and means for biasing the units toward each other.

References Cited in the file of this patent

UNITED STATES PATENTS

| | | |
|---|---|---|
| 1,461,758 | Hosford | July 17, 1923 |
| 1,579,260 | Tiller | Apr. 6, 1926 |
| 1,639,973 | Van Orstrand | Aug. 23, 1927 |
| 1,739,247 | Marchev | Dec. 10, 1929 |
| 1,768,809 | Van Orstrand | July 1, 1930 |
| 2,085,264 | Lyon | June 29, 1937 |
| 2,184,035 | Buccione | Dec. 19, 1939 |
| 2,311,025 | Burgner | Feb. 16, 1943 |
| 2,652,630 | Niland | Sept. 22, 1953 |
| 2,711,026 | Nelson et al. | June 21, 1955 |

FOREIGN PATENTS

| | | |
|---|---|---|
| 626,185 | Germany | Feb. 21, 1936 |